(12) United States Patent
Fukumoto

(10) Patent No.: US 11,516,570 B2
(45) Date of Patent: Nov. 29, 2022

(54) SILENT VOICE INPUT

(71) Applicant: MICROSOFT TECHNOLOGY LICENSING, LLC, Redmond, WA (US)

(72) Inventor: Masaaki Fukumoto, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/365,792

(22) Filed: Jul. 1, 2021

(65) Prior Publication Data
US 2021/0337293 A1    Oct. 28, 2021

Related U.S. Application Data

(63) Continuation of application No. 16/620,364, filed as application No. PCT/CN2017/087767 on Jun. 9, 2017, now Pat. No. 11,089,396.

(51) Int. Cl.
H04R 1/20    (2006.01)
H04R 1/08    (2006.01)
G10L 15/22   (2006.01)
G10L 25/78   (2013.01)

(52) U.S. Cl.
CPC .............. H04R 1/083 (2013.01); G10L 15/22 (2013.01); G10L 25/78 (2013.01); H04R 2201/107 (2013.01); H04R 2410/07 (2013.01); H04R 2420/07 (2013.01)

(58) Field of Classification Search
CPC .......... H04R 1/083; G10L 15/22; G10L 25/78
See application file for complete search history.

(56) References Cited

U.S. PATENT DOCUMENTS

| | | | |
|---|---|---|---|
| 6,343,269 B1* | 1/2002 | Harada | G10L 15/24 704/E15.041 |
| 2002/0194005 A1* | 12/2002 | Lahr | G10L 15/24 704/E15.041 |
| 2010/0131268 A1* | 5/2010 | Moeller | G10L 21/0364 704/E15.039 |
| 2014/0278432 A1* | 9/2014 | Harman | G10L 13/00 704/261 |

* cited by examiner

Primary Examiner — Simon King

(57) ABSTRACT

Implementations of the subject matter described herein provide a silent voice input solution without being noticed by surroundings. Compared with conventional voice input solutions which are based on normal speech or whispering, the proposed "silent" voice input method is performed by using ingressive voice during the user's breathing-in process. By placing the apparatus very close to the user's mouth with a ultra-small gap formed between the microphone and the apparatus, the proposed silent voice input solution can realize a very small voice leakage, and thereby allowing the user to use ultra-low voice speech input in public and mobile situations, without disturbing surrounding people.

20 Claims, 7 Drawing Sheets

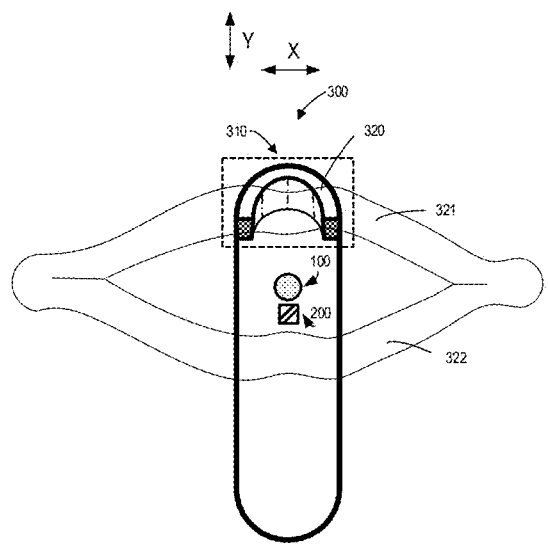
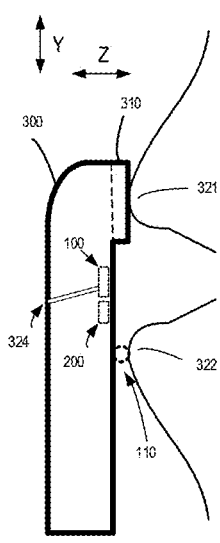
FIG. 3A  FIG. 3B
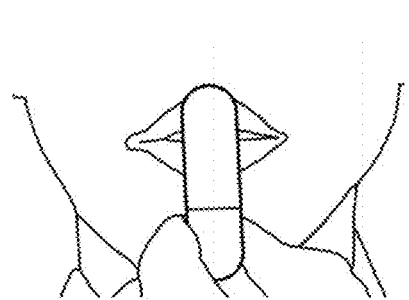
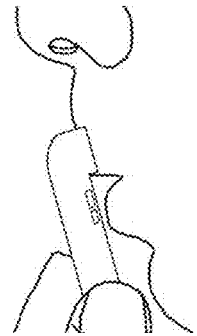
FIG. 3C  FIG. 3D

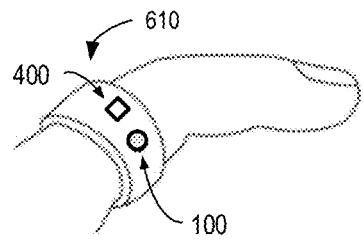
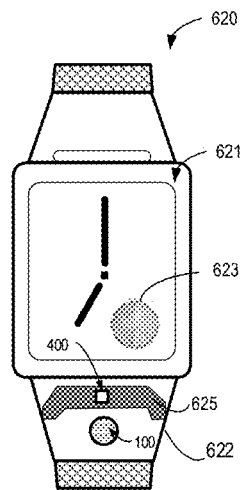
FIG. 6A  FIG. 6B
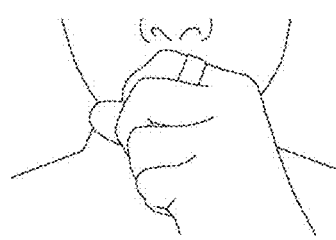
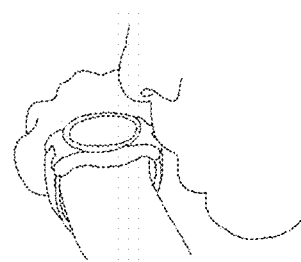
FIG. 6C  FIG. 6D

SILENT VOICE INPUT

CROSS-REFERENCE TO RELATED APPLICATIONS

This application is a continuation of U.S. patent application Ser. No. 16/620,364, filed Dec. 6, 2019, now U.S. Pat. No. 11,089,396, which was the National Stage of International Application No. PCT/CN2017/087767, filed Jun. 9, 2017, which applications are hereby incorporated by reference in their entirety herein. To the extent appropriate a claim for priority is made to the above disclosed applications.

BACKGROUND

Voice input as an effective interface enables high-speed input without special training of for example input methods. With fast development of voice recognition engines, such as cloud-based voice recognition engines, voice input enables an improved recognition accuracy and has already widely used especially for specific application scenarios such as automatic telephone answering systems, hands-free operations while driving and package-handling, and clinical record dictations by doctors. Additionally, smartphones and smart Internet-of-things (IoT) devices also incorporate voice input interfaces into people's daily life.

SUMMARY

Although performance of voice input has been greatly improved, the voice input is still rarely used in public spaces, such as office or even homes. This is mainly because the voice leakage could disturb and even annoy surrounding people in quiet environment. On the other hand, there is still a risk of scattering private information to unintended audiences. These are not technical issues but social issues. Hence there is no easy fix even if voice recognition system performance is greatly improved.

Implementations of the subject matter described herein provide a silent voice input solution without being noticed by surroundings. Compared with conventional voice input solutions which are based on normal speech or whispering that use egressive (breathing-out) airflow while speaking, the proposed "silent" voice input method is performed by using opposite (ingressive or breathing-in) airflow while speaking. By placing the apparatus (e.g. microphone) of the apparatus very close to the user's mouth with an small gap formed between the mouth and the apparatus, the proposed silent voice input solution can capture stable utterance signal with a very small voice leakage, and thereby allowing the user to use ultra-low volume speech input in public and mobile situations, without disturbing surrounding people. Besides of air flow direction (ingressive and egressive), all other utterance manners are same as our whispering, so that proposed method can be used without special practice.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

BRIEF DESCRIPTION OF THE DRAWINGS

The above and other objectives, features and advantages of the subject matter described herein will become more apparent through more detailed depiction of example implementations of the subject matter described herein in conjunction with the accompanying drawings, wherein in the example implementations of the subject matter described herein, same reference numerals usually represent same components.

FIGS. 3A-3D illustrate an example silent voice input apparatuses according to an implementation of the subject matter described herein;

FIGS. 6A-6K illustrate some possible application scenarios based on various types of silent voice input apparatuses according to various implementations of the subject matter described herein.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below. A definition of a term is consistent throughout the description unless the context clearly indicates otherwise.

Figure 1:
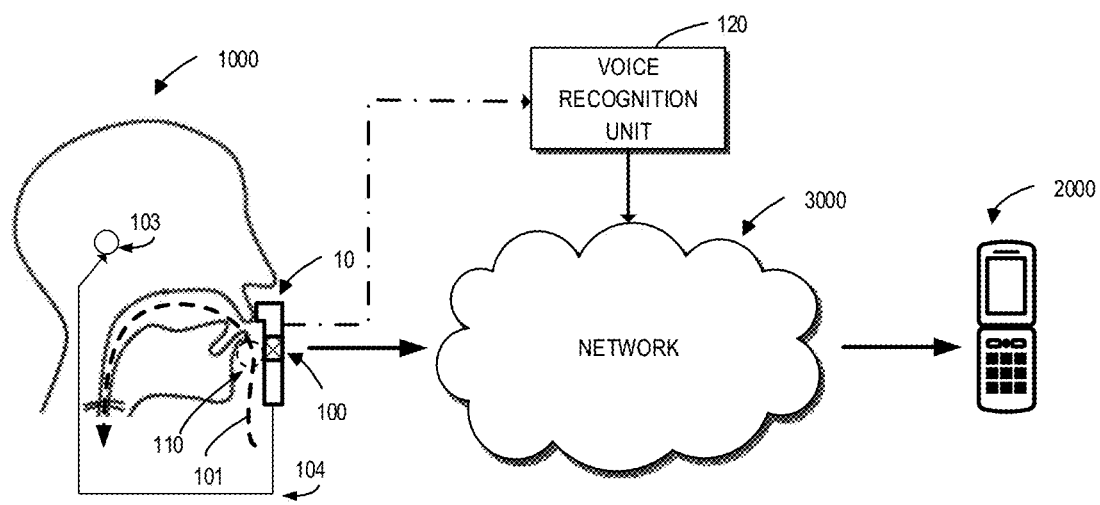
FIG. 1 is a schematic configuration of an example voice input system having a silent voice input apparatus according to an implementation of the subject matter described herein.

FIG. 1 shows a schematic configuration of an example voice input system according to an implementation of the subject matter described herein. As shown, the system includes a silent voice input apparatus 10 which can be an individual component or a module integrated in the cellphone or in any other type of electronic device. Generally speaking, the silent voice input apparatus 10 is configured to receive and process the user's "silent" voice input. As used herein, the phrase "silent voice" indicates a voice that is generated during the user's utterance with ingressive airflow. Upon receiving the user's silent voice, the apparatus 10 converts the user's silent voice to a recognized signal and directs the recognized signal as an output over a network 3000 to a remote entity, such as another user who is receiving a phone call from the user 1000. In this way, the user 1000 in a public space can have a conversation with the other party at a remote location, without disturbing the surrounding people.

The remote entity may receive the user's voice via a terminal device 2000, such as a cell phone. Meanwhile, if the terminal device 2000 that the other entity has is also equipped with a silent voice input apparatus 10 as shown in FIG. 1, the other entity can input the silent voice in a similar manner and likewise direct his/her voice back to the user 1000. Of course, the other entity may only have a regular cell phone as illustrated in FIG. 1 that does not support silent input function as described above.

Those skilled in the art may understand that the communication system as illustrated in FIG. 1 is merely for illustration without suggesting any limitations as to the scope of the subject matter described herein. The silent input apparatus 10 can also be applied in other application scenarios.

In some implementations, the silent voice input apparatus 10 enables the user to interact with a local computer or any local device or any resources on the network (e.g. the Internet). For example, the user 1000 speaks query words or sentences by using silent voice, then the voice recognition unit 120 converts the words or sentences to text information and sends it to the corresponding applications and obtains the results. Thus, the user 1000 can confirm schedules or e-mails or search results triggered by silent voice. The voice recognition unit 120 may be placed or deployed on the network side. For example, the retrieved data is converted to voice with, for example, the Text-To-Speech (TTS) system, and fed back to the user 1000 via, for example, an earphone 103 worn by the user 1000. Other feedback methods such as display may also be used. In one example implementation, the user 1000 may query with short words like "Next Meeting?" by using silent voice. The TTS system converts the retrieved information, such as "10 am", to sound, and then transfers the sound back to the user 1000 via the earphone 103.

Still referring to FIG. 1, in order to generate the silent voice, the user 1000 may place the apparatus 10 very close to the mouth, thereby defining a gap 110 between the user's lower lips and the apparatus 10. It is effective to keep the gap 110 as small as possible (such as 1 mm in some examples) for generating stable silent voice with low amount of ingressive airflow.

As further illustrated in FIG. 1, the apparatus 10 according to implementations of the subject matter described herein mainly includes a microphone 100. It is effective to place the microphone 100 at the very close position of narrowly opened mouth (such as 1 mm in some examples) for capturing small silent voice and increasing signal-to-noise (S/N) ratio of the signal. The microphone 100 can be configured to detect sound generated by the user during the ingressive utterance as a silent voice and convert the silent voice to a signal representing the silent voice for further processing. The ingressive air flow 101 herein is defined as an air flow flowing from outside into the mouth through the formed gap 110.

Acoustically, the ingressive air flow 101 is generated by the user's silent voice during the ingressive utterance. In this case, the gap 110 forms an artificial sound source which generates air turbulence that is very similar as generated at the narrow gap between the vocal cords of a human when performing a whisper speech. In both case (whisper speech and silent speech), the vocal cords are not vibrated.

Figures 2A, 2B:
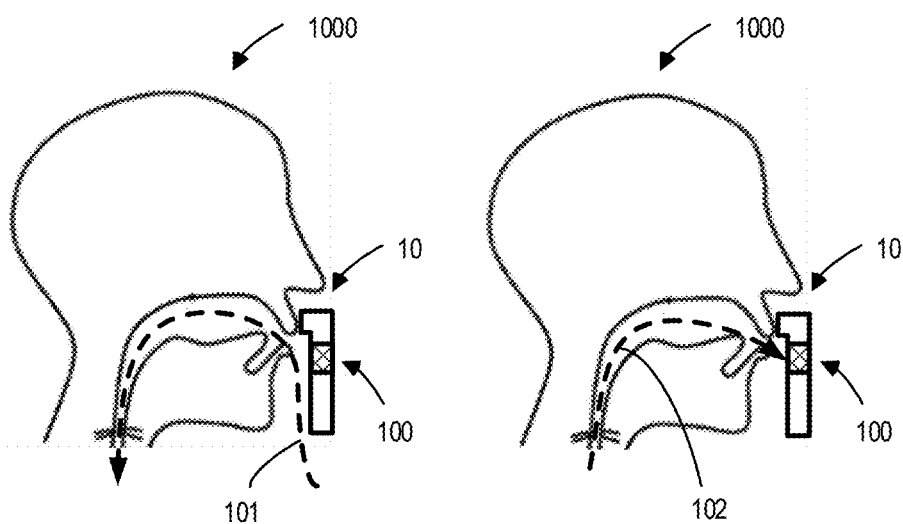
FIG. 2A illustrates the air flow of the silent speech.
FIG. 2B illustrates the air flow of a normal speech or whispering.

FIG. 2A illustrates the air flow of the silent speech that uses ingressive air flow, and FIG. 2B illustrates the air flow of a normal speech (herein, normal speech sometimes means both of normal speech and whispering, both of which use "egressive" air flow). In the normal speech (and whispering speech, too) as shown in FIG. 2B, egressive (or exhaled) air flow 102 directly hits diaphragm (not shown) of the microphone 100, which may make the captured voice heavily distorted, especially when the microphone 100 is placed very close to the mouth and the mouth is narrowly opened. Most significant case is so called "pop noise" that is caused when uttering/f/or/p/sound. In this event, the microphone 100 in not suitable to be placed at the very close position of the mouth even though it might be the best position for capturing small voice sound.

In contrast, the proposed ingressive speech as shown in FIG. 2A generate almost no "pop noise", because contrary to the egressive air flow 102, the generated ingressive air flow 101 only passes by the microphone 100 without directly hitting the diaphragm of the microphone 100. Therefore, the microphone 100 is suitable to be placed at a very close position of the narrowly-opened mouth, and ultra-small voice sound with a good S/N ratio thus can be captured.

In some implementations, the microphone 100 can be an omni-directional type microphone. In some other implementations, the microphone 100 can be a noise canceling (bi-directional) type microphone that is beneficial for eliminating surrounding noise. However, other types of microphones are also possible according to specific requirements.

As discussed above, it may be beneficial to keep a narrow air gap between the microphone 100 and mouth for generating large and substantial turbulence with a small amount of inspiratory air. Therefore, in some implementations, the size of the gap is adjusted to approximately 1-2 mm from tip to lower lip. In this case, the microphone 100 can capture the ingressive air flow corresponding to the user's ultra-small voice, and thus can convert the ingressive utterance sound to a signal for voice communication or voice instruction with a good enough S/N ratio.

Now referring back to FIG. 1, the gap 110 and the position of the microphone can be adjusted by the user 1000. By feeding captured silent voice signal back to the user (indicated by line 104 in FIG. 1) in real time by using the earphone 103, the user can easily keep proper positioning of the apparatus relative to the mouth.

In some implementations, the microphone 100 can be arranged at a substrate 300. FIG. 3 illustrates a schematic design of the apparatus 10 including a substrate 300 accommodating the microphone 100. Such a plate- or stick-shaped shielding substrate 300 as shown in FIG. 3 may facilitate the formation of the narrow gap and further enable a stable gap size. Specifically, the substrate 300 may have an end portion 310 with contact surface 320 (as shown in FIG. 3A) for touching the user's upper lip 321. Upon a contact of an end portion 310 of the substrate 300 to the user's upper lip 321, the microphone 100 will be substantially placed at the very close position (e.g. 1-2 mm) of narrowly opened mouth, and the gap 110 between shielding substrate 300 and the lower lip 322 (as shown in FIG. 3B) will be substantially kept with narrow amount (e.g. 1 mm). The convex shape of the end portion 310 also prevents the collision between the lower lip 322 and the substrate 300 during the utterance, for reducing unexpected touch or friction noise. In some embodiments, if the microphone 100 is bi-directional (or noise-canceling) type, it may have two sound ports (that is, front-side and back-side), and in this case, the front-side sound port is faced towards the mouth, and the back-side sound port 324 is opened for opposite side of the substrate 300 for maximizing noise canceling effect. FIGS. 3C and 3D illustrate the apparatus 10 as shown in FIGS. 3A and 3B that is being used by a user.

Moreover, compared to the normal speech and whispering, the combination of use of silent voice with the closely placed shielding plate to the mouth as illustrated in FIG. 3 has been proven to be able to reduce the sound leakage to the outside.

Figures 4A, 4B:
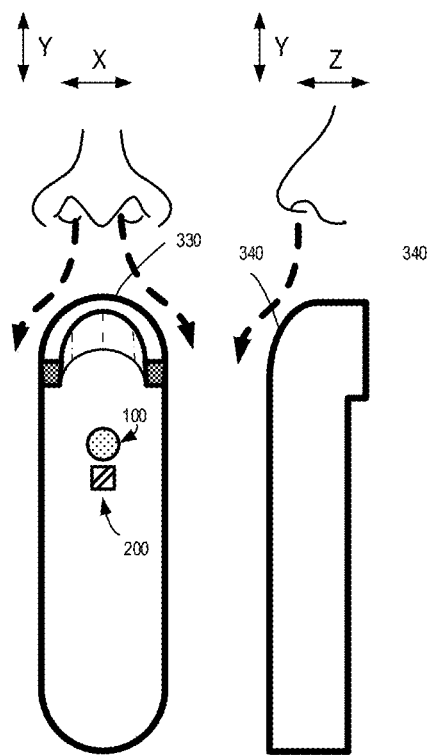
FIGS. 4A-4B illustrate blocking nasal air flows by using the silent voice input apparatuses of FIG. 3.

Now referring to FIG. 4, in some implementations, the end portion 310 may include a top surface 330 of a rounded shape in X-Y plane. The rounded top surface 330 is helpful for blocking nasal air flow during utterance. Alternatively, or in addition, the end portion 310 may include a stream-lined top profile 340 in Y-Z plane, which also blocks nasal air flow, and thereby eliminating the snort noise.

In overall, such design of the apparatus 10 as illustrated in FIG. 4 enables both good air flow performance and good portability (or wearability). For example, pendant and pen-shaped devices provide both easy-to-grip (when in use), and good wearability (when not in use). Moreover, the voice-based interaction system enables eyes-free operation, so that users can use the system quickly and safely in many situations even while walking or driving. However, it is to be understood, the design of the apparatus 10 may vary for meeting different situations/conditions or depending on the user's preferences. More possible designs and application scenarios will be discussed later.

Continuing to refer to FIG. 4, in some implementations, the apparatus 10 may further include a flow sensor 200. The flow sensor 200 may be configured to sense the ingressive air flow (as well as the egressive air flow) by detecting the direction of the air flow. It is to be understood that the flow sensor 200 in some embodiments might be required to be placed as close to the microphone 100 as possible for enhancing sensitivity. In this way, the normal speech and the silent speech can be easily separated by simply measuring the direction of the air flow. As such, the same apparatus 10 can be used as either a silent voice input device or a normal voice input device. Further, with such flow sensor 200, no manual switches (such as a button) or activation words (such as "Hi Cortana", or "Hi Siri") are needed to switch between the two modes, which enables a hands-free and smooth switching between the two modes.

Figure 5:
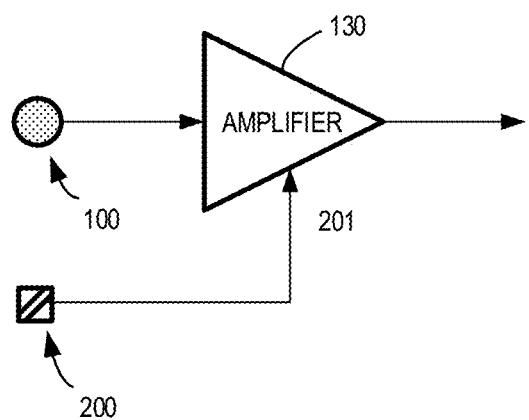
FIG. 5 illustrates a block diagram of an example implementation of the silent voice input apparatus according to one implementation of the subject matter described herein.

In some implementations, the apparatus 10 may further includes an amplifier 130 coupled to the microphone 100 and configured to amplify the signal output from the microphone 100, such as a 10× microphone amplifier. FIG. 5 shows an example block diagram of the apparatus 10 according to one implementation of the subject matter described herein. In this case, the captured signal is amplified by the amplifier 130 only when the inspiratory conditions are detected by the flow sensor 200. In the example as illustrated in FIG. 5, upon detecting an ingressive air flow, the flow sensor 200 will generate an enabling signal 201 for the amplifier 130 to activate the silent voice mode. Otherwise, the microphone 100 will be working under the normal mode for receiving the normal speech, in which the received signal is not amplified.

The circuit structure of apparatus 10 as illustrated in FIG. 5 is simple, and the control logic for the switching condition can also be achieved by using one or more logic gates (not shown). In this case, in some implementations, the microphone 100, the amplifier 130, the flow sensor 200, and the logic gates can be integrated within one common circuit board with fabrication technologies now known or later developed. In some other implementations, the amplifier 130 may be included in the microphone 100 as a component of the microphone 100.

In some implementations, a user may use ingressive speech to give commands or instructions to a local device, and those (usually short) commands/instructions may rarely occur in people's normal utterances. In this case, the user may freely switch from an ongoing normal conversation with the other entity to silent-voice-based commands/instructions to a local device, without being noticed by the other entity. This is very helpful especially for the users who work in call centers or some other telephone-intensive jobs, or for anybody wishing to have both hands free during a telephone conversation.

Alternatively, or in addition, the apparatus 10 may further include a proximity sensor 400. The proximity sensor 400 is configured to sense the touch of the user's mouth (or upper lip only) to the microphone 100 by detecting a size of the gap between the microphone 100 and the mouth. Such proximity sensors 400 usually are much smaller and cheaper than the flow sensors 200, thus could substitute the flow sensor 200 in many applications, such as watch-shaped apparatus or TV-remote controller based apparatus that does not support any long-term continuous operation such as dictation or telecommunication function. In those cases, the user 1000 may raise his/her hand only when saying silent-voice-based query words or commands, therefore the much simpler proximity sensor 400 can also be used instead of the flow sensor 200. Accordingly, the enabling signal 201 for activating the amplifier 201 (or the silent voice mode) in FIG. 5 may be a signal indicating that the user's mouth is getting close to the apparatus 10.

The types of proximity sensors 400 include but not limited to, optical, magnetic, capacitive, and inductive and so on. It is to be understood that scope of the subject matter described herein is not limited in this aspect.

Now referring back to FIG. 1, the apparatus 10 may further includes a voice recognition unit 120 that is coupled to the microphone 100 and configured to receive the signal corresponding to the silent voice of the user 1000, and generate a recognized signal based on an acoustic model exclusively for ingressive utterance.

Almost all general voice recognition systems are designed for normal utterance, and therefore may not properly recognize other types of utterance (such as whispering and silent voice) in initial settings. Therefore, in some implementations, the acoustic model is previously trained for the ingressive utterance, in order to enhance the recognition accuracy.

Alternatively, or in addition, in some implementations, the voice recognition unit 120 can be further configured to generate the recognized signal, based on one or more special pronunciation dictionaries for the ingressive voice to further enhance the recognition accuracy. This is because, for the ingressive voice, some "unvoiced" phonemes (e.g. /k/, /s/, and /f/) may be mixed with corresponding "voiced" phonemes (e.g. /g/, /z/, and /b/). In addition, signal level of nasal sounds (e.g. /m/, /n/) may decrease. For example, captured silent voice sound /zin/ may reflect /zin/ or /sin/, silent voice sound /am/ may reflect /nam/ or /mam/. Therefore, in some implementations, using a special pronunciation dictionary that reflects above mentioned phonemes substitution may be efficient. The voice recognition unit 120 as shown in FIG. 1 can be a client unit or a cloud-based apparatus, or it can be part of the server. It should be understood that scope of the subject matter described herein is not limited in this aspect.

As discussed above, the apparatus 10 for silent voice input according to implementations of the subject matter only requires simple components including a for example, microphone 100 and a flow or proximity sensor 200, 400. Therefore, it is easy to integrate such simple circuit structure into other type of objects that are commonly used in people's daily life. FIGS. 6A-6E illustrate some possible application scenarios based on various types of apparatus.

In some implementations as illustrated in FIG. 6A, the ring style device 610 that has a thin microphone 100 at the bottom of the ring and an optical proximity sensor at the side of the ring (not shown). When the ring device 610 is worn on the index finger of a user and the user may touch the bottom of the index finger to the upper lip with a lightly grasping hand, the proper shaped air gap and acoustic insulation is thus naturally obtained. Moreover, this posture (covering mouth with hand) is very natural and does not seem strange from surroundings.

In some implementation, especially in mobile situations, the user can quickly take a note (text memo or voice memo) by using a pen or smartphone-style apparatus 10 without disturbing nearby individuals.

FIG. 6B shows examples of smart watch 620 with a small screen 621. Proposed apparatus 10 can be easily embedded in the watchband 622 with a proximity sensor 400. Convex shape 625 can keep proper gap between the watchband 622 and the mouth, keep proper position of the microphone 100, and also prevent nasal air flow. In some embodiments, the convex shape 625 may be combined with the edge of the screen 621 or chassis of the smart watch 620. The retrieved information, upon a query by the user 1000, can be displayed on the smart watch's screen 621 as an answer to the query. As an example as illustrated in FIG. 6B, if the user is interested in the moon phase of the day, a moon phase 623 may be displayed on the screen 621 upon the user's query. Further, as discussed above, a voice feedback may be additionally provided to the user 1000 as well, to facilitate the user 1000 understanding the retrieved information. FIG. 6C illustrates that the ring style device 610 as shown in FIG. 6A is being used by a user, and FIG. 6D illustrates that the smart watch 620 as shown in FIG. 6B is being used by a user.

Figure 6E:
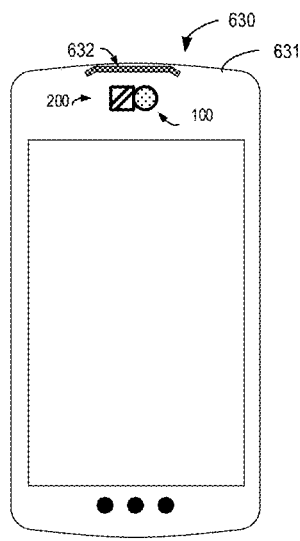

As illustrated in FIG. 6E, the apparatus 10 can also easily be embedded in a smart phone 630 (with the flow sensor 200). The smart phone 630 serves as an effective shielding "plate" and can be easily fixed at upper lip with for example the upper edge of the chassis 631. To achieve much securer positioning and blocking nasal air flow, convex shape 632 may be used. This form-factor is suitable for visual information retrieval in mobile situations such as map navigation, or photo-search. FIG. 6G illustrates that the smart phone 630 as shown in FIG. 6E is being used by a user.

Figure 6F:
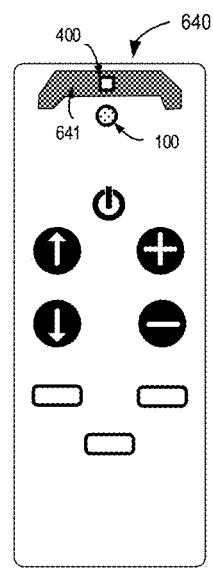
Figure 6G:
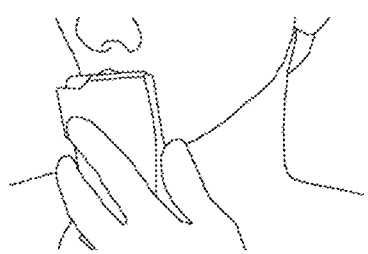
Figure 6H:

FIG. 6F illustrates an example of a remote controller 640 with a proximity sensor 400 and the microphone 100. Convex shape 641 likewise can keep proper gap between the chassis 640 and the mouth, keep proper position of the microphone 100, and also prevents nasal air flow. Proposed silent voice input method enables unnoticeable voice control in a living room. For this purpose, a cost-effective proximity sensor 400 is good enough for short command operations. FIG. 6H illustrates that the remote controller 640 as shown in FIG. 6F is being used by a user.

Figures 6I, 6J:
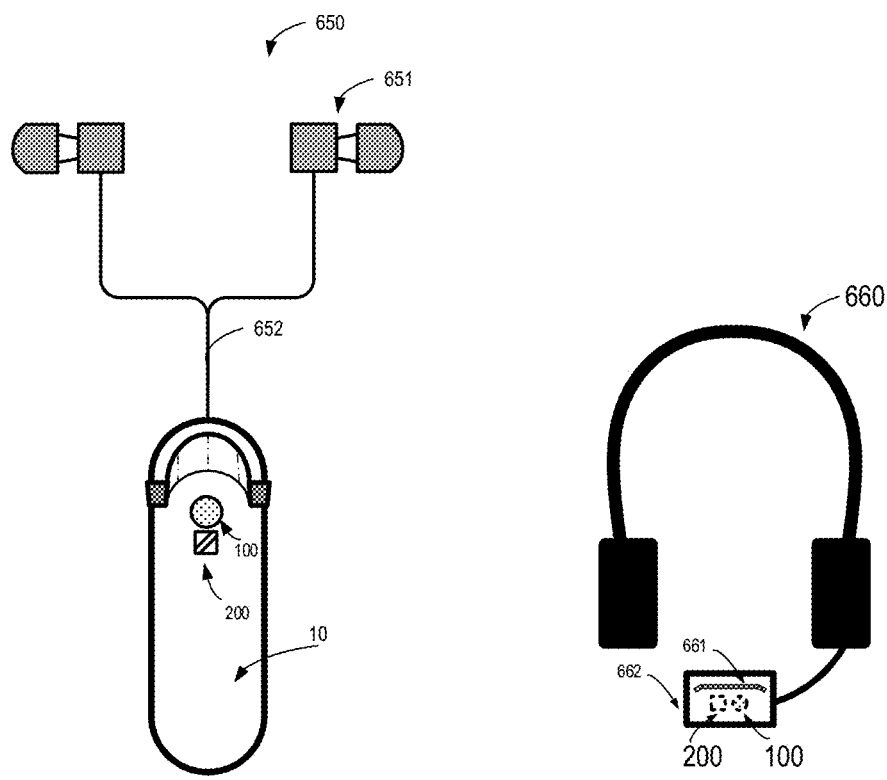

FIG. 6I is an example of headset 650 for real-time voice communication by directly transferring captured voice signals. As shown in FIG. 6E, the apparatus 10 is combined with a head phone 651. The user can make/receive telephone calls in public spaces without annoying surrounding people. A flow sensor 200 is needed for long-term operations. In addition, as discussed above, the microphone 100 can also be used as a normal microphone when deactivated. Another possible "special" case is using proposed method for face-to-face communication, enabling secure conversations in public spaces.

As further illustrated in FIG. 6I, the apparatus 10 is combined with a head phone 651 via a connectable cable or cord 652. However, it is to be understood that the cable 652 is not limited to the hard-wired connections as illustrated in FIG. 6E. Rather, wireless connections such as Bluetooth, Wi-Fi, or optical communication are also possible. In some implementations, it is of course possible to have a cordless headset 650, and in this case, the apparatus 10 could be even an integrated or embedded component in the head phone 651.

Figure 6K:
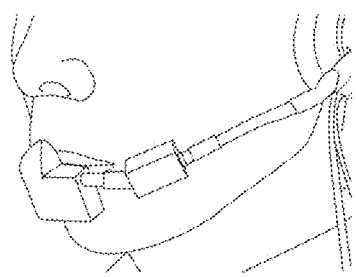

FIG. 6J is an example of overhead-style headset 660 that is commonly used at offices and call centers. Convex shape 661 can keep proper gap between the sensor chassis 662 and the mouth, keep proper position of the microphone 100, and also prevents nasal air flow. Hands-free switching with flow sensor 200 enables speedy document creation by combining proposed silent voice input method and conventional keyboard input. FIG. 6K illustrates that the overhead-style headset 660 as shown in FIG. 6J is being used by a user.

Figure 7:
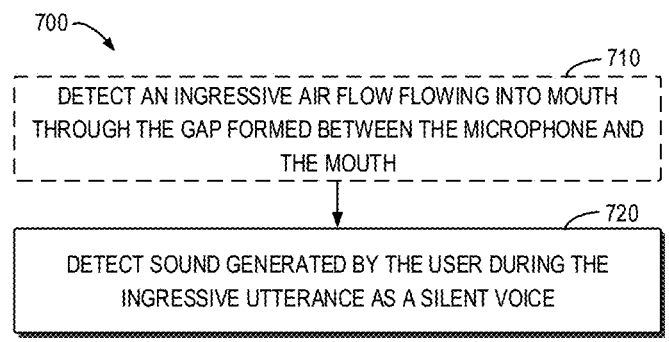
FIG. 7 illustrates a flowchart of a method for silent voice input in accordance with one implementation of the subject matter described herein.

FIG. 7 illustrates a flowchart of a method 700 in accordance with one implementation of the subject matter described herein. In case that a microphone 100 is in proximity to a user's mouth to form a gap 110 between the microphone 100 and the mouth, at 710, an ingressive air flow 101 flowing into the mouth through the gap 110 formed between the microphone 100 and the mouth is detected. At 720, the sound generated by the user during the ingressive utterance is detected as a silent voice. Detailed actions at blocks 710 and 720 and possible other optional actions have been described above and will not be repeated herein.

Hereinafter, some example implementations of the subject matter described herein will be listed.

In some implementations, an apparatus for voice input is provided. The apparatus comprises: a microphone configured to, in case that the apparatus being in proximity to a user's mouth to form a gap between the apparatus and the mouth: in response to an ingressive air flow flowing into the mouth through the gap formed between the apparatus and the mouth during an ingressive utterance by the user, detect a silent voice generated by the ingressive utterance.

In some implementations, the apparatus further comprises: a substrate accommodating the microphone and having an end portion for touching the user's upper lip to substantially align the microphone with the user's mouth and form the gap between the substrate and the user's lower lip.

In some implementations, the apparatus further comprises: a flow sensor configured to sense the ingressive air flow by detecting a direction of the air flow.

In some implementations, the apparatus further comprises: a proximity sensor configured to sense a proximity of the user's mouth to the microphone by detecting a size of the gap between the microphone and the mouth.

In some implementations, the apparatus further comprises: an amplifier coupled to the microphone and configured to amplify the signal output from the microphone, in response to receiving a signal indicating an ingressive air flow or a signal indicating a proximity of the user's mouth to the microphone.

In some implementations, the end portion of the substrate includes a contact surface that at least partially conforms to a profile of the user's upper lip.

In some implementations, the end portion includes a top surface of a rounded shape.

In some implementations, the apparatus further comprises: a voice recognition unit coupled to the microphone and configured to receive the signal corresponding to the silent voice of the user; and generate a recognized signal based on an acoustic model for ingressive utterance.

In some implementations, the voice recognition unit is further configured to generate the recognized signal corresponding to the silent voice of the user, based on a pronunciation dictionary for the ingressive utterance.

In some implementations, the pronunciation dictionary includes voiced consonants that may have potential for substituting for corresponding unvoiced consonants in the ingressive utterance, and nasal sounds that may have potential to be deleted from the ingressive utterance.

In some implementations, the apparatus is coupled to a headphone or a headset.

In some implementations, the apparatus is included in a cell phone.

In some implementations, the apparatus is included in a ring or a watch or a pen.

In some implementations, the apparatus is included in a remote controller.

In some implementations, a method for voice input is provided. The method comprises: in response to an ingressive air flow flowing into the mouth through the gap formed between a microphone and the mouth during an ingressive utterance by a user, detecting a silent voice generated by the ingressive utterance, the gap being formed between the microphone and the mouth in the case that the microphone is in proximity to the mouth.

In some implementations, the method further comprises: sensing the ingressive air flow by detecting a direction of the air flow.

In some implementations, the method further comprises: sensing a proximity of the user's mouth to the microphone by detecting a size of the gap between the microphone and the mouth.

In some implementations, the method further comprises: amplifying the signal output from the microphone, in response to receiving a signal indicating an ingressive air flow or a signal indicating a proximity of the user's mouth to the microphone.

In some implementations, the method further comprises: receiving the signal corresponding to the silent voice of the user; and generating a recognized signal based on an acoustic model for ingressive utterance.

In some implementations, the generating a recognized signal further comprising: generating the recognized signal, based on a pronunciation dictionary for the ingressive utterance.

In some implementations, the pronunciation dictionary includes voiced consonants that may have potential for substituting for corresponding unvoiced consonants in the ingressive utterance, and nasal sounds that may have potential to be deleted from the ingressive utterance.

In some implementations, a microphone is provided. The microphone comprises: a processing unit configured to: in response to an ingressive air flow flowing into the mouth through the gap formed between the microphone and the mouth during an ingressive utterance by a user, detecting a silent voice generated by the ingressive utterance, the gap being formed between the microphone device and the mouth in the case that the microphone is in proximity to the mouth.

I claim:

1. An apparatus for ingressive voice input, comprising:
   a microphone configured to detect a silent voice when the apparatus is in proximity to a user's mouth to form a gap between the apparatus and the user's mouth;
   a proximity sensor configured to detect a proximity of the user's mouth to the microphone; and
   a flow sensor configured to sense ingressive air flow from the user by detecting a direction of the air flow,
   wherein the sensed proximity of the user's mouth to the microphone is within a predetermined minimum, and
   wherein the silent voice is detected based on the sensed ingressive air flow.

2. The apparatus of claim 1, wherein the silent voice is generated by the user's ingressive air flow while speaking.

3. The apparatus of claim 1, wherein the silent voice is generated by an ingressive utterance by the user.

4. The proximity sensor of claim 1, wherein the proximity of the user's mouth to the microphone is sensed by detecting a size of a gap between the microphone and the user's mouth.

5. The flow sensor of claim 1, wherein the ingressive air flow is sensed by detecting the air flow into of the user's mouth.

6. The apparatus of claim 1, further comprising:
   an amplifier coupled to the microphone and configured to amplify a signal output from the microphone, in response to receiving a signal indicating an ingressive air flow or a signal indicating a proximity of the user's mouth to the microphone.

7. The apparatus of claim 1, further comprising:
   a voice recognition unit coupled to the microphone and configured to:
      receive a signal corresponding to the silent voice of the user; and
      generate a recognized signal based on an acoustic model for ingressive utterance.

8. The apparatus of claim 1, wherein the apparatus is included in a cell phone.

9. A method for providing a silent voice input from an user's ingressive air flow, comprising:
   detecting a proximity of the user's mouth to a microphone;
   detecting an ingressive air flow into the user's mouth through a gap between the microphone and the user's mouth;
   detecting sound generated by the user during the ingressive air flow; and
   providing the silent voice input to the microphone based on the detected sound,
   wherein the detected proximity of the user's mouth to the microphone is within a predetermined minimum.

10. The method of claim 9, wherein the silent voice is generated by the user's ingressive air flow while speaking.

11. The method of claim 9, wherein the silent voice is generated by an ingressive utterance by the user.

12. The method of claim 9, wherein the proximity of the user's mouth to the microphone is sensed by detecting a size of a gap between the microphone and the user's mouth.

13. The method of claim 9, wherein detecting the ingressive air flow is based on detecting a direction of the air flow into the user's mouth.

14. The method of claim 9, further comprising:
   sensing the ingressive air flow by detecting a direction of the air flow.

15. The method of claim 9, further comprising:
   amplifying a signal output from the microphone in response to receiving a signal indicating an ingressive air flow or a signal indicating a proximity of of the user's mouth to the microphone.

16. The method of claim 9, further comprising:
   receiving a signal corresponding to the silent voice of the user; and
   generating a recognized signal based on an acoustic model for ingressive utterance.

17. A silent voice recognition unit, comprising:
a microphone coupled to the silent voice recognition unit, the silent voice recognition unit configured to receive signals from the microphone corresponding to a silent voice of a user when the microphone is within a predetermined proximity to of the user's mouth and when the received signals comprise the silent voice in a form of an ingressive air flow from the user.

18. The silent voice recognition unit of claim 17, wherein the silent voice is generated by the user's ingressive air flow while speaking.

19. The silent voice recognition unit of claim 17, wherein the proximity of the user's mouth to the microphone is sensed by detecting a size of a gap between the microphone and the user's mouth.

20. The silent voice recognition unit of claim 17, wherein the apparatus is coupled to a headphone or a headset.

* * * * *